United States Patent [19]

Kameyama et al.

[11] Patent Number: 5,739,925
[45] Date of Patent: Apr. 14, 1998

[54] FACSIMILE APPARATUS COVER AND FEEDING MECHANISM

[75] Inventors: Yoshikatsu Kameyama, Hashima-gun; Yasuhito Bandai, Nagoya; Tomohisa Higuchi, Nagoya; Hiroaki Yazawa, Nagoya; Makoto Yamada, Gifu, all of Japan

[73] Assignee: Brother Kogyo Kabushiki Kaisha, Nagoya, Japan

[21] Appl. No.: 649,975

[22] Filed: May 16, 1996

Related U.S. Application Data

[63] Continuation of Ser. No. 275,731, Jul. 19, 1994, abandoned.

[30] Foreign Application Priority Data

Nov. 1, 1993 [JP] Japan ............... 5-297256

[51] Int. Cl.$^6$ ............................................. H04N 1/12
[52] U.S. Cl. ............................. 358/498; 358/496
[58] Field of Search ........................ 358/474, 496, 358/498, 400, 488; 271/220, 264, 265; 347/186, 222; 399/18.21; 395/113; H04N 1/12

[56] References Cited

U.S. PATENT DOCUMENTS

| | | | |
|---|---|---|---|
| 5,128,763 | 7/1992 | Sakuragi | 358/498 |
| 5,138,463 | 8/1992 | Morimoto et al. | 358/496 |
| 5,274,477 | 12/1993 | Mori et al. | 358/498 |
| 5,307,116 | 4/1994 | Ikunami et al. | |
| 5,325,214 | 6/1994 | Ijuin et al. | 358/429 |
| 5,346,457 | 9/1994 | Kimura | |
| 5,358,231 | 10/1994 | Andela | |
| 5,452,098 | 9/1995 | Sato et al. | 358/498 |
| 5,519,512 | 5/1996 | Bandai et al. | 358/498 |
| 5,553,842 | 9/1996 | Wilcox et al. | 358/498 |
| 5,559,609 | 9/1996 | Yamada et al. | 358/498 |
| 5,604,609 | 2/1997 | Seguchi et al. | 358/488 |

*Primary Examiner*—Kim Vu
*Attorney, Agent, or Firm*—Oliff & Berridge, PLC

[57] ABSTRACT

A facsimile apparatus includes a main body frame, an operable cover plate for covering at least the front top of the main body frame, a separating roller for separating a document sheet attached to the main body frame and a document feeding mechanism for feeding a document sheet separated by the separating roller. All of the rollers in the document feeding mechanism are attached to the main body frame. Since all rollers of the document feeding mechanism are attached to the main body frame, it is not necessary that the cover plate have high rigidity. Consequently, the weight of the cover plate can be reduced, and the manufacturing cost of the cover plate can be reduced.

24 Claims, 6 Drawing Sheets

FACSIMILE APPARATUS COVER AND FEEDING MECHANISM

This is a Continuation of application Ser. No. 08/275,731 filed Jul. 19, 1994, now abandoned.

BACKGROUND OF THE INVENTION

1. Field of the Invention

The present invention relates to a facsimile apparatus and, more particularly, to a facsimile apparatus in which a mechanism of feeding a document is changed and thereby the cover elements opening the upper side of the frame of the facsimile apparatus can be simplified.

2. Description of the Related Art

In the facsimile apparatus so far in use, referring to FIG. 6, there have been provided a main body frame 201, a openable cover plate covering at least the upper front side of the main body frame 201, a separating roller 203 attached to the main body frame for separating a document sheet, and a document feeding mechanism for feeding a document sheet that is separated by the separating roller 203. The document feeding mechanism comprises a first driving roller 204 driven by a driving motor, a first pinch roller 205 for pressing the document sheet against the first driving roller 204, a second driving roller 206 disposed on a front side in the direction of feed of the document, a second pinch roller 207 for pressing a document sheet against the second driving roller 206, and driving means including a driving motor.

When the document sheet is fed improperly causing a jam condition, the first and second pinch rollers 205, 207 attached to the cover plate enable removal of the jammed document sheet by opening the cover plate. Elastic means such as a rubber plate may be used instead of the first pinch roller.

The cover plate in the conventional apparatus, however, must have a high rigidity when the pinch rollers are attached to the cover plate. For this reason, the cover plate is generally made of a synthetic resin and metal. Thus, there have been such problems with the above described conventional facsimile apparatus in that the weight of the cover plate cannot be reduced and that the manufacturing cost of the cover plate is expensive. It is possible to make a cover plate using only synthetic resin, however, since the thickness of a wall portion or a rib portion must be larger to provide a sufficient rigidity of the cover plate, there is a problem achieving a compact, lightweight and low cost cover plate.

SUMMARY OF THE INVENTION

An object of the present invention is to provide a facsimile apparatus wherein the weight of cover plate is reduced, and the manufacturing cost is made smaller.

According to a first aspect of the invention, there is provided a facsimile apparatus having a main body frame, a operable cover plate for covering at least the front top of the main body frame, a separating roller attached to the main body frame for separating a document sheet, and a document feeding mechanism for feeding a document sheet separated by the separating roller, wherein all rollers in the document feeding mechanism are attached to the main body frame.

According to a second aspect of the invention, an operating knob is provided on the roller element roller axis of the driving side driven by a driving motor of the document feeding mechanism.

In the facsimile apparatus in its first aspect, since all rollers of a document feeding mechanism are attached to the main body frame, it is not necessary that the cover plate have a high rigidity. Consequently, the weight of the cover plate can be reduced, and the manufacturing cost of the cover plate can be reduced greatly.

In he facsimile apparatus in its second aspect, since an operating knob is provided on the roller element roller axis of the driving side driven by a driving motor of the document feeding mechanism, when a document sheet is jammed, the jammed document sheet can be removed by manually rotating the roller elements.

BRIEF DESCRIPTION OF THE DRAWINGS

A preferred embodiment of the present invention will be described in detail with reference to the accompanying drawings, wherein.

DETAILED DESCRIPTION OF PREFERRED EMBODIMENTS

A preferred embodiment of the invention will be described below with reference to the accompanying drawings.

Figure 1:
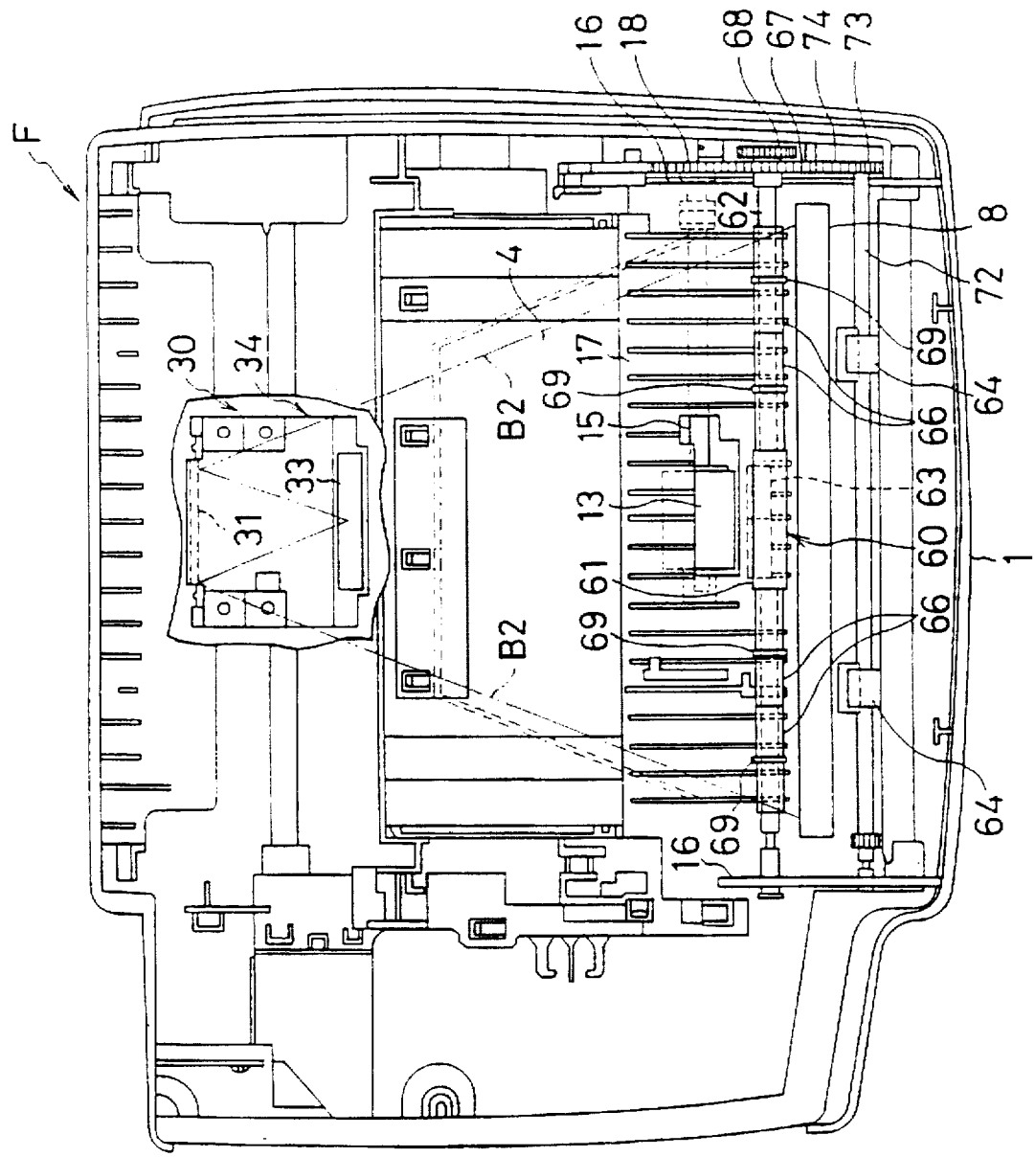
FIG. 1 is a plan view showing the principal components of a facsimile apparatus in a preferred embodiment according to the invention.
Figure 2:
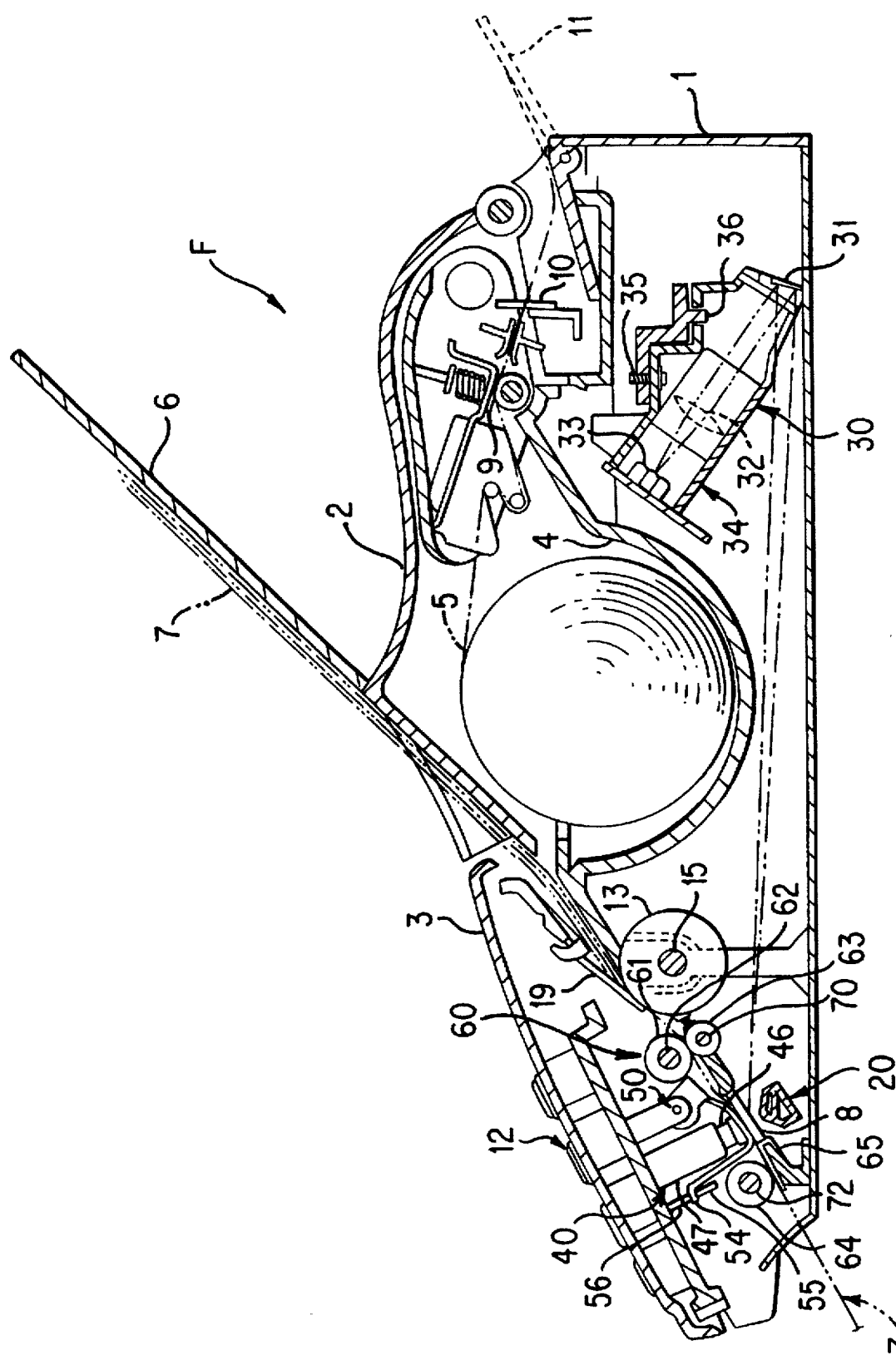
FIG. 2 is a longitudinal side view of the facsimile apparatus of FIG. 1.
Figure 3:
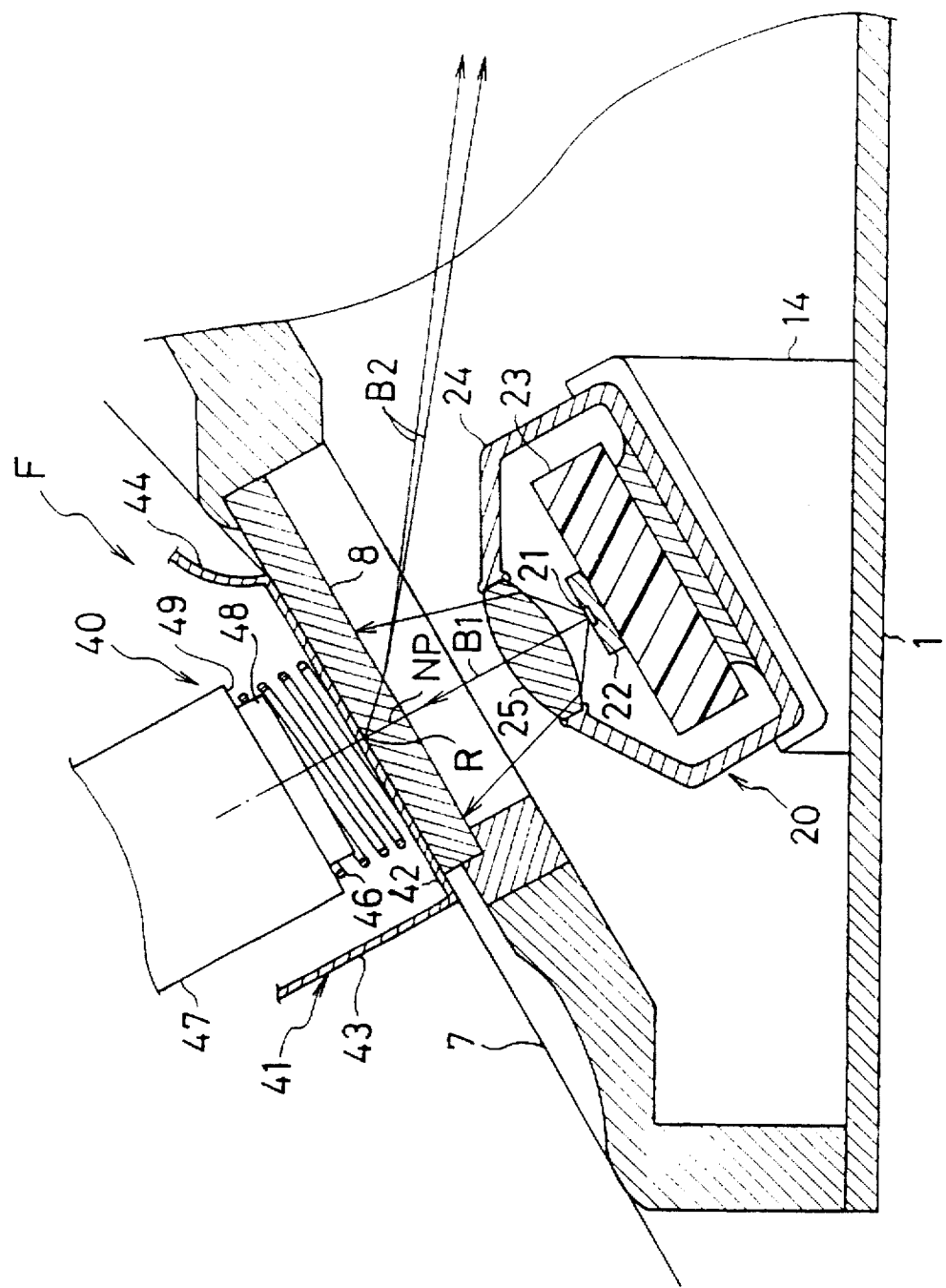
FIG. 3 is an enlarged sectional view showing a light emitting unit and the vicinity thereof in the facsimile apparatus of FIG. 1.

As shown in FIG. 1 to FIG. 3, a facsimile apparatus F comprises a body frame 1, a recording paper cover 2 for operably covering the upper rear portion of the body frame 1, a panel cover 3 for operably covering the upper front portion of the body frame 1, recording paper 5 in a roll contained in a recording paper containing portion 4, a document tray 6, on which a document is set, a separation roller 13 for separating the documents 7 one after another, a light emitting unit 20, a light sensing unit 30 with a reflection mirror, a document feed mechanism 60 for feeding the document 7, a transparent glass plate 8 (corresponding to a transparent member) for supporting the document 7 from below in the vicinity of a reading line R on the document 7, a document pressing mechanism 40 for pressing the document 7 against the glass plate 8, a thermal head 9 for printing the recording paper 5 of a thermal recording type, a cutting edge 10 for cutting the recording paper 5 after printing, a recording paper tray 11 for receiving the cut recording paper 5, a console panel 12 provided on the panel cover 3, and a control unit (not shown) incorporated in the body frame 1.

First, the optical system including the light emitting unit 20, the light sensing unit 30 with a reflection mirror and the like will be described hereunder.

As shown in FIG. 1 to FIG. 3, the light emitting unit 20 includes a light emitting element substrate 22 with a plurality of light emitting diodes 21 arranged at substantially predetermined intervals in the lateral direction, a base plate 23 on which the light emitting element substrate 22 is fixed, a case 24, and a condenser lens 25 for condensing incoming beams B1 from the plurality of light emitting diodes 21. The light emitting unit 20 is formed to be longer than the width of the document 7 and fixedly mounted on a mounting portion 14 in the body frame 1.

The incoming beams B1 from the light emitting unit 20 are reflected on the reading line R on the document 7 and supplied to the light sensing unit 30 as outgoing beams B2 for reading, wherein the light emitting unit 20 is disposed such that the incoming beams B1 enter in a direction parallel to a normal plane NP perpendicular to the surface of the document 7 on the reading line R, and such that the outgoing beams B2 for reading travel backward in a substantially horizontal direction. The document 7 in the position of the reading line R is declined forwardly at about 30°.

Accordingly, the incoming beams B1 from the light emitting unit 20 enter at a right angle with respect to the document 7, and the outgoing beams B2 for reading are emitted with an inclination of about 40° with respect to the normal plane NP in the direction opposite to the direction of feed of the document 7.

Thus, since the outgoing beams B2 for reading reflected on the document 7 travel backward in a substantially horizontal direction, it is possible to dispense with a reflection mirror having a large length in the lateral direction and requiring high incorporating accuracy, thereby reducing cost for parts and assembling work.

The condenser lens 25 is a slender lens in the form of a bar stretched in the lateral direction, and it has a radius of curvature of about 6 mm and a predetermined thickness of about 2.5 mm. This condenser lens 25 is constituted such that the incoming beams B1 from the light emitting unit 20 are converged into the region of about 10 mm in width around the reading line R.

Thus, the incoming beams from the light emitting unit 20 are effectively radiated only in the vicinity of the reading line R of the document 7, and therefore, the outgoing beams B2 for reading can be provided with sufficiently high intensity so that high reliability in reading can be maintained.

The light sensing unit 30 has a reflection mirror 31 for changing the direction of the outgoing beams B2 for reading, a focusing lens 32, and a plurality of photodiodes 33, where the reflection mirror 31 is disposed right before the focusing lens 32.

The reflection mirror 31, focusing lens 32, and plurality of photodiodes 33 are integrated into the light sensing unit 30. The light sensing unit 30 is disposed slantwise in the rear of the interior of the body frame 1, and it is fixedly positioned on a fixing portion in the body frame 1 through two screws 35 and two pins 36, which are formed integrally with the body frame 1.

Since the reflection mirror 31, focusing lens 32, and plurality of photodiodes 33 are integrated into the light sensing unit 30, the accuracy in the positioning of the reflection mirror 31 relative to the focusing lens 32 and plurality of photodiodes 33 is improved. Additionally, not only reliability in reading is improved but also the labor for positioning and fixing the reflection mirror 31 in the body frame 1 can be decreased.

The document pressing mechanism 40 will be described below.

Figure 4:
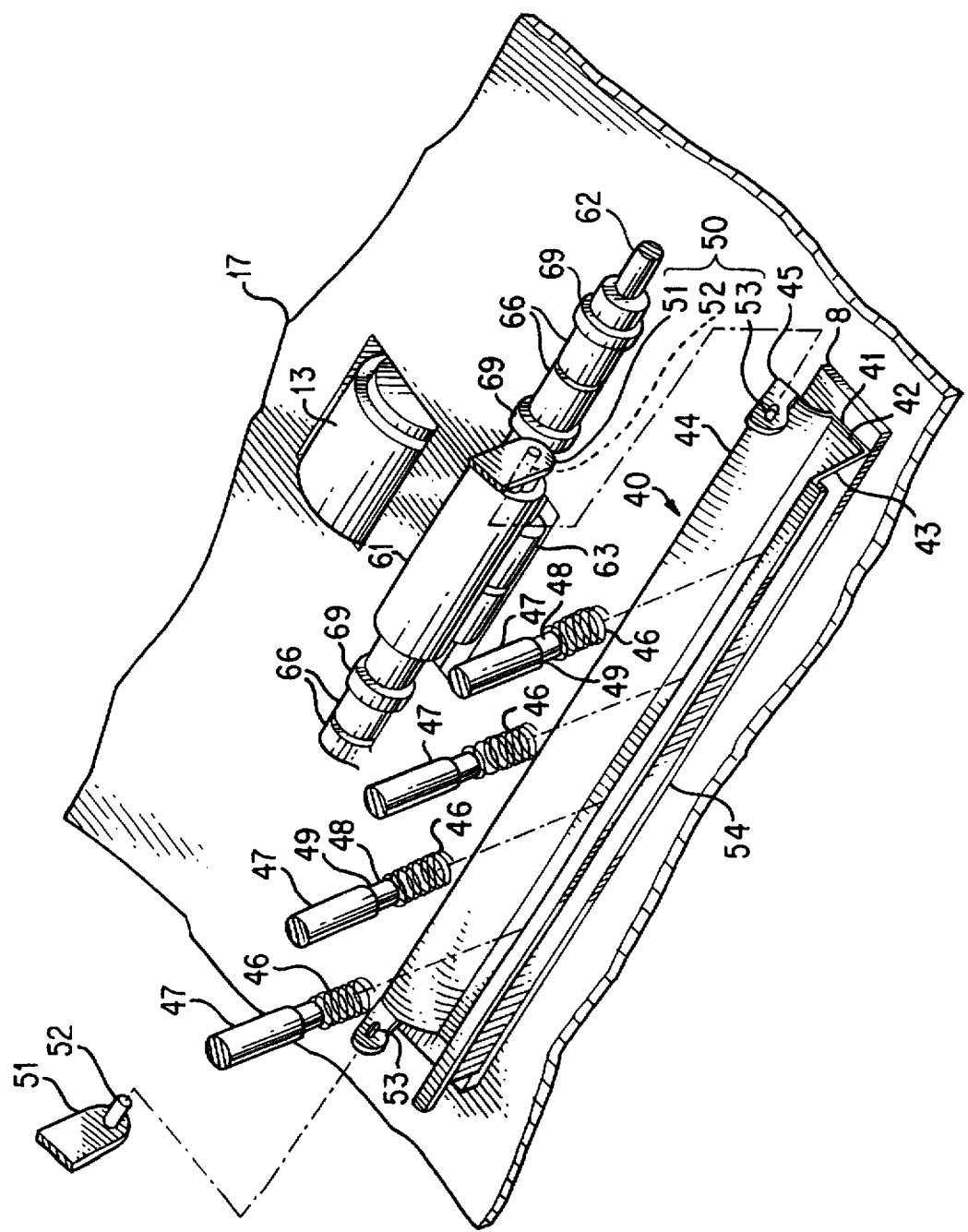
FIG. 4 is a perspective view showing the principal components of a document presser mechanism in the facsimile apparatus of FIG. 1.
Figure 5:
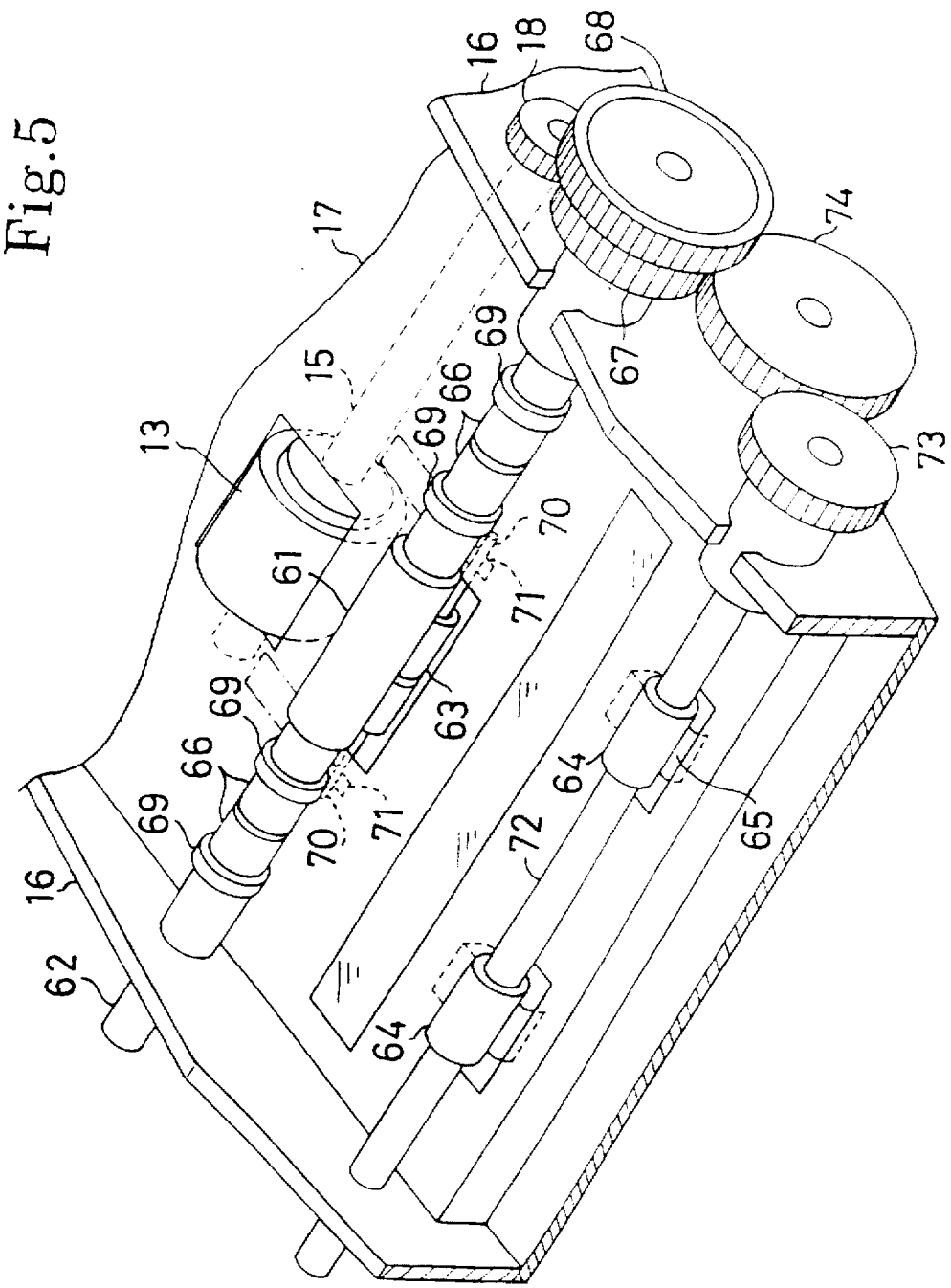
FIG. 5 is a perspective view showing the principal components of a document feed mechanism in the facsimile apparatus of FIG. 1.
Figure 6:
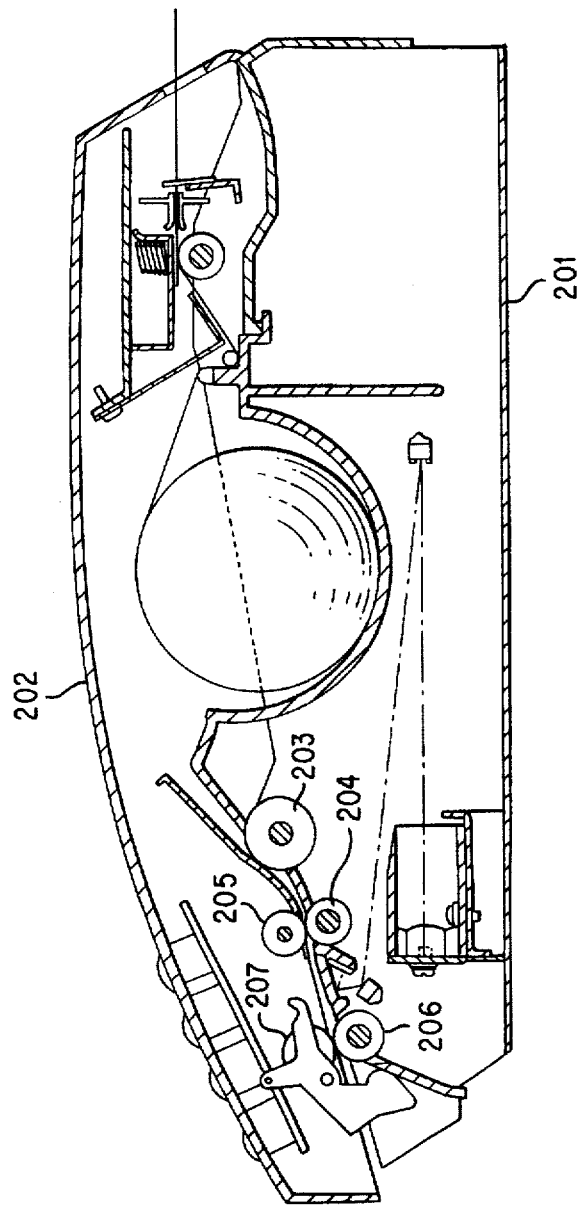
FIG. 6 is a longitudinal side view of a conventional facsimile apparatus.

As illustrated in FIGS. 2 through 4, the document pressing mechanism 40 is formed of a document presser 41, four compression coil springs 46 for urging the document presser 41 toward the glass plate 8, and an elevatable support mechanism 50 for supporting the document presser 41 on the panel cover 3 such that the document presser 41 is maintained parallel to and movable toward or away from the glass plate 8. The document presser 41 is made of a thin metallic plate and comprises a bottom plate portion 42, at the lower portion thereof, for bringing the document 7 into contact with the glass plate 8 and having its bottom surface painted white for white level checking; a panel portion 43 rising from the front end of the bottom plate portion 42; a guide plate portion 44 integrally extended from the rear end of the bottom plate portion 42; and a pair of support pieces 45 rising from the right and left ends of the guide plate portion 44.

On the bottom face of the panel cover 3, four rod-shaped spring bearings 47 are projected for supporting the four springs 46. At the end of each spring bearing 47 is formed a stepped smaller-diameter portion 48. Thus, the spring 46 is placed between the step portion 49 at the upper end of the smaller-diameter portion 48 and the bottom plate portion 42.

The elevatable support mechanism 50 will be described below. A pair of right and left support brackets 51 are disposed in the panel cover 3 in the positions corresponding to the right and left support pieces 45. At the lower ends of the support brackets 51 are fixedly provided pins 52 extending toward each other. Each of the support pieces 45 is provided with a slit 53 elongated in the direction perpendicular to the bottom plate portion 42, and the pins 52 are inserted into the slits 53 on the right and left sides.

The upper end portion of the panel plate portion 43 is bent forward so that a hook portion 54 is formed. The hook portion 54 is elevatably engaged with a narrow and long rectangular hole 56 formed sideways in a rib 55 projecting from the panel cover 3 (FIG. 2).

With the elevatable support member 50 structured as described above, the document presser 41 is supported on the panel cover 3 such that the bottom plate 42 of the document presser 41 is movable toward and away from the glass plate 8 and maintained parallel thereto.

Since the document presser 41 is resiliently urged toward the glass plate 8 by the four springs 46, the bottom plate portion 42 of the document presser 41 and the glass plate 8 are brought into close contact with each other with the document 7 interposed therebetween. Accordingly, sufficient reliability in reading the document is secured. When the reading is performed without bringing the document 7 into close contact with the glass plate 8, an error in reading may be produced.

The separation roller 13 and the document feed mechanism 60 will be described below with reference to FIGS. 1, 2, 4, and 5.

The separation roller 13 is formed of a rubber roller of a predetermined length of about 35.5 mm and a relatively large diameter of about 20 mm, and it is disposed in the middle of the width of the document and upstream in the direction of feed of the document from the light emitting unit 20. The right-hand end portion of a roller shaft 15 of the separation roller 13 is rotatably supported in the right-hand wall 16 of the body frame 1, and the left-hand end portion thereof is supported by a portion projecting from the rear side of an internal sloped wall 17 of the body frame 1. Further, there is provided a gear 18 on the right-hand end portion of the roller shaft 15 outside the right-hand wall 16. On the upper side of the separation roller 13, an elastic plate 19 is provided for pressing the documents 7 against the separation roller 13. The documents 7 are separated one by one and fed forward from the document tray 6 by means of the separation roller 13 and the elastic plate 19.

The document feed mechanism 60 comprises a feed roller 61 and a feed pinch roller 63 for pressing the document 7 against the feed roller 61, where these rollers are disposed between the separation roller 13 and the glass plate 8 and positioned on the upper and lower sides in the center of the width of the document 7; a pair of right and left delivery rollers 64 disposed upstream of the glass plate 8 and placed on the upper side of the document 7; a pair of right and left leaf springs 65 placed on the lower side of the document 7 for pressing the document 7 against the delivery rollers 64; and a plurality of collars 66 mounted on the roller shaft 62 of the feed roller 61.

The roller shaft 62 of the feed roller 61 is rotatably supported at the right and left end portions thereof by the right and left side walls 16 of the body frame 1. At the right-hand end portion of the roller shaft 62, there are fixed a gear 67 to be meshed with the gear 18 and a knob 68 for manually rotating the roller shaft 62.

On the right-hand and left-hand sides of the feed roller 61, the two collars 66 each preferably made of a synthetic resin are rotatably fitted to the roller shaft 62. Annular ribs 69 having the same diameter as the feed roller 61 are formed integrally with each collar 66.

Since the annular rib 69 is formed so as to have the same diameter as that of the feed roller 61, the upper side of the document 7 is controlled to be in the same plane by the feed roller 61 and the four collars 66, and, in such a state, the document 7 is transported between the glass plate 8 and the document presser 41. With the described arrangement, no distortion is produced in the document 7 on the reading line R, and reliability in reading is further secured.

The feed pinch roller 63 is an idling roller not longer than the feed roller 61, and both right and left end portions of the roller shaft 70 are resiliently urged upward by plate spring members 71.

The roller shaft 72 of the delivery rollers 64 is rotatably supported at both end portions thereof by the right and left side walls 16 of the body frame 1, and a gear 73 is fixed to the right end portion of the roller shaft 72. The gear 73 is operatively associated with the gear 67 of the roller shaft 62 of the feed roller 61 through a gear 74 pivotally attached to the side wall 16.

Further, there is provided a document feeding electric motor (not shown) to be controlled by a control unit, and a gear (not shown) of an output shaft of the electric motor is operatively meshed with the gear 18 of the roller shaft 15 of the separation roller 13.

Since all the rollers of the document feed mechanism 60 are supported by the body frame 1, there is no need for the panel cover 3 to bear any roller, and hence, the panel cover 3 is not required to have high rigidity to bear a roller. Accordingly, it has become possible to form the panel cover 3 of a synthetic resin cover that is lower in rigidity and lighter in weight.

Operation of the above described facsimile apparatus F will be described below.

Since the light emitting unit 20 is disposed downstream in the direction of feed of the document with respect to the normal plane NP perpendicular to the surface of the document 7 on the reading line R so that the outgoing beams B2 for reading travel backward in substantially the horizontal direction, it is made possible to dispense with a reflection mirror that would otherwise be required right below the document 7.

Further, since the reflection mirror 31 and the light sensing unit 34 are formed into an integrated light sensing unit 30, which is disposed in the rear of the interior of the body frame 1, the incorporating work of the reflection mirror 31 and the light sensing unit 34 can be simplified, the front portion of the facsimile apparatus F can be made smaller in height, and the design appearance can be improved. Further, since the light sensing unit 34 is disposed slantwise, the height of the rear portion of the facsimile apparatus F can also be reduced.

Since the light emitting unit 20 is provided with the condenser lens 25, it is made possible to increase the brightness in the region over a predetermined width near the reading line and improve reliability in reading the document.

Further, since the document presser 41 is elevatably supported by the elevatable support mechanism 50 and also it is resiliently urged toward the glass plate 8 by the plurality of springs 46, the document 7 can be read while in close contact with the glass plate 8 by means of the document presser 41, thus securing reliability in reading the document.

Since all of the rollers of the document feed mechanism 60 are supported by the body frame 1, the need for the panel cover 3 to support any roller is eliminated, and hence, the need for increasing the rigidity of the panel cover 3 for supporting a roller is eliminated. As a result, it is made possible to construct the panel cover 3 of a synthetic resin cover having low rigidity and light weight.

Further, the knob 68 for manual operation is attached at the end of the roller shaft 62 of the feed roller 61, and the document 7, if put into a jammed state, can be removed by rotating the roller shaft 62 forwardly or reversely by the knob 68.

While, in the above described embodiment, the light emitting unit 20 is disposed such that the incoming beams enter in the direction parallel to the normal plane NP, it is not limited to the described disposition. For example, the incoming beams emitted from the light emitting unit 20 may enter in the direction inclined with respect to the normal plane NP downstream in the direction of feed of the document.

While a preferred embodiment has been described, such description is for illustrative purpose only, and it will be understood that various changes may be made therein to embody the invention without departing from the spirit of the invention.

What is claimed is:

1. A facsimile apparatus comprising:

a stationary main body frame having an opening;

a cover element entirely covering the opening in said stationary main body frame and pivotally attached to said stationary main body frame for selectively covering a front upper side of the facsimile apparatus;

a document feeding mechanism for feeding a document sheet, wherein all rollers in said document feeding mechanism are attached to said stationary main body frame, the opening of the main body frame exposing the rollers of the document feeding mechanism when the cover element is in an open position; and an operating knob for manual rotating operation of the exposed rollers of said document feeding mechanism so as to remove the document sheet in a jammed state.

2. A facsimile apparatus as claimed in claim 1, wherein said document feeding mechanism is driven by a driving motor.

3. A facsimile apparatus as claimed in claim 1, further comprising a separating roller for separating a document sheet stacked on a stacker, wherein said separating roller is attached to said stationary main body frame.

4. A facsimile apparatus as claimed in claim 2, wherein said document feeding mechanism further comprises a first feeding roller for feeding a document sheet separated by said separating roller and disposed on an upper side of an image reading area in a direction of paper feed.

5. A facsimile apparatus as claimed in claim 4, further comprising a second feeding roller for exhausting a document sheet outside of said facsimile apparatus, said second feeding roller attached to said stationary main body frame and disposed in a lower side of the image reading area in the direction of the paper feed.

6. A facsimile apparatus as claimed in claim 5, further comprising a pinch roller disposed on a side opposite to said first feeding roller, said pinch roller pressing said first feeding roller.

7. A facsimile apparatus as claimed in claim 6, further comprising a leaf spring pressing said second feeding roller and disposed on a side opposite to said second feeding roller.

8. A facsimile apparatus as claimed in claim 7, wherein said cover element comprises an operating panel for inputting numbers and instructions.

9. A facsimile apparatus as claimed in claim 1, further comprising a recording paper cover openably covering an upper rear portion of said stationary main body frame.

10. A facsimile apparatus comprising:
 a main body frame supporting rollers and having a front and a rear opening, said main body frame having a document feeding mechanism for feeding a document sheet to be read at a reading area, wherein all rollers of said document feeding mechanism are rotatably supported by said main body frame;
 a cover for entirely covering the front opening in said main body frame and pivotally attached to said main body frame for selectively covering a front upper side of the facsimile apparatus facilitating removal of a jammed document sheet, said cover having an operating panel for inputting data, the front opening of the main body frame exposing the rollers of the document feeding mechanism when the cover is in an open position;
 a recording paper cover entirely covering the rear opening in said main body frame for selectively covering an upper rear portion of said main body frame; and
 an operating knob for manual rotating operation of said rollers of said document feeding mechanism so as to remove the document sheet in a jammed state.

11. A facsimile apparatus as claimed in claim 10, wherein said document feeding mechanism comprises a separating roller for separating a document sheet on a stacker, said separating roller rotatably supported by said main body frame.

12. A facsimile apparatus as claimed in claim 11, wherein said document feeding mechanism further comprises a first feeding roller for feeding a document sheet separated by said separating roller, said first feeding roller disposed on an upper side of the reading area in a direction of paper feed and rotatably supported by said main body frame.

13. A facsimile apparatus as claimed in claim 12, wherein said first feeding roller is driven by a drive motor and comprises an operating knob for manual rotating operation of said first feeding roller.

14. A facsimile apparatus as claimed in claim 13, further comprising a second roller for exhausting a document sheet outside of said facsimile apparatus, said second feeding roller disposed in a lower side of the image reading area in the direction of the paper feed and rotatably supported by said main body frame.

15. A facsimile apparatus as claimed in claim 10, further comprising a second roller for exhausting a document sheet outside of said facsimile apparatus, said second feeding roller disposed in a lower side of the reading area in the direction of the paper feed and rotatably supported by said main body frame.

16. A facsimile apparatus as claimed in claim 10, wherein said main body frame is stationary.

17. A facsimile apparatus as claimed in claim 16, wherein said document feeding mechanism further comprises a first feeding roller for feeding a document sheet separated by a separating roller, said first feeding roller disposed on an upper side of the reading area in a direction of paper feed and rotatably supported by said main body frame.

18. A facsimile apparatus as claimed in claim 17, wherein said first feeding roller is driven by a drive motor and comprises the operating knob for manual rotating operation of said first feeding roller.

19. A facsimile apparatus as claimed in claim 18, further comprising a second roller for exhausting a document sheet outside of said facsimile apparatus, said second feeding roller disposed in a lower side of the image reading area in the direction of the paper feed and rotatably supported by said main body frame.

20. A facsimile apparatus as claimed in claim 19, wherein said document feeding mechanism comprises the separating roller for separating a document sheet on a stacker, said separating roller rotatably supported by said main body frame.

21. A facsimile apparatus comprising:
 a main frame having an opening;
 a cover element pivotally supported by the main frame;
 a document feeding mechanism having at least one roller rotatably supported by the main frame; and
 an image reading mechanism located in the main frame for reading an image on an original document sheet,
 wherein the cover element comprises a document pressing mechanism for pressing the original document sheet against the image reading mechanism so the original document sheet can be read by the image reading mechanism when the cover is in a closed position and so the original document sheet will not change position when the cover is brought to an opened position.

22. A facsimile apparatus as claimed in claim 21, wherein said at least one roller comprises:
 a first feeding roller for feeding the original document sheet to the image reading mechanism; and
 a second feeding roller for feeding the original document sheet from the image reading mechanism to a location outside of the facsimile apparatus.

23. A facsimile apparatus as claimed in claim 21, further comprising an operating knob for manual rotating operation of the at least one roller of said document feeding mechanism so as to remove the original document sheet in a jammed state.

24. A facsimile apparatus as claimed in claim 21, wherein said document feeding mechanism comprises a separating roller for separating the original document sheet on a stacker, said separating roller rotatably supported by said main frame.

* * * * *